United States Patent [19]

Webb et al.

[11] Patent Number: 4,673,449

[45] Date of Patent: Jun. 16, 1987

[54] SEALING OF A PIPE-JOINT

[75] Inventors: Stephen F. Webb, Tyldesley; Brian J. Merrick, Urmston, both of England

[73] Assignee: British Gas Corporation, London, England

[21] Appl. No.: 742,226

[22] Filed: Jun. 7, 1985

[30] Foreign Application Priority Data

Jun. 7, 1984 [GB] United Kingdom ............... 8414544

[51] Int. Cl.$^4$ ............................................. B32B 35/00
[52] U.S. Cl. .................................. 156/94; 29/402.02; 138/97; 138/98; 156/294; 156/332; 264/36; 427/140; 428/63
[58] Field of Search .................. 156/94, 294, 332; 138/97, 98; 264/36; 427/140; 408/1 R; 428/63

[56] References Cited

U.S. PATENT DOCUMENTS

| 3,472,285 | 10/1969 | Ginsburgh et al. | 138/97 |
| 4,304,805 | 12/1981 | Packo et al. | 156/94 X |
| 4,331,580 | 5/1982 | Bunyan | 156/294 X |
| 4,358,417 | 11/1982 | Beinhauer | 264/36 |
| 4,582,551 | 4/1986 | Parkes et al. | 156/94 |

FOREIGN PATENT DOCUMENTS

| 0056327 | 7/1982 | European Pat. Off. . |
| 1119313 | 7/1968 | United Kingdom . |
| 1417106 | 12/1975 | United Kingdom . |
| 1500241 | 2/1978 | United Kingdom . |
| 2027513 | 2/1980 | United Kingdom . |
| 2063409 | 6/1981 | United Kingdom . |
| 2119058 | 11/1983 | United Kingdom . |
| 2140530 | 11/1984 | United Kingdom . |
| 2142703 | 1/1986 | United Kingdom . |

Primary Examiner—Robert A. Dawson
Attorney, Agent, or Firm—Oblon, Fisher, Spivak, McClelland & Maier

[57] ABSTRACT

A method for sealing a pipe-joint comprises injecting from a point or points 5 externally of the pipe an anaerobically curable monomer into the joint gap in such quantity that the monomer forms a contiguous band 9 within the joint gap and allowing the monomer to cure within the joint gap.

3 Claims, 7 Drawing Figures

SEALING OF A PIPE-JOINT

The present invention relates to the sealing of a pipe joint, particularly of the type including a preexisting annular seal in a joint gap.

According to another aspect of the present invention, there is provided a method for sealing a pipe joint, the method comprising injecting from a point or points externally of the pipe an anaerobically curable monomer into the joint gap in such a quantity that the monomer forms a contiguous band within the joint gap and allowing the monomer to cure within the joint gap.

Figure 1:
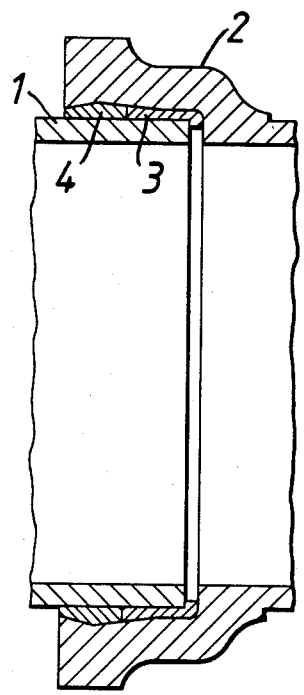
Figure 2:
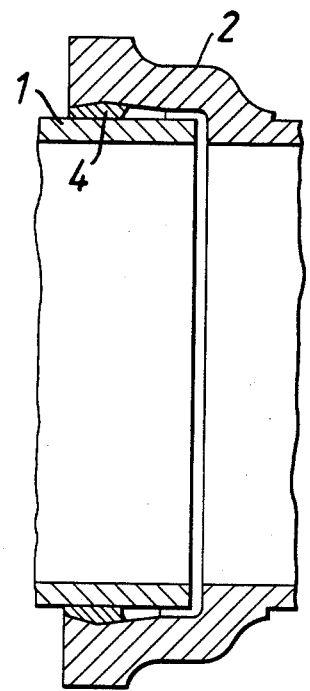
Figure 3:
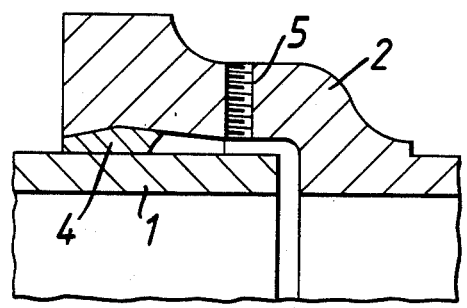
Figure 5:
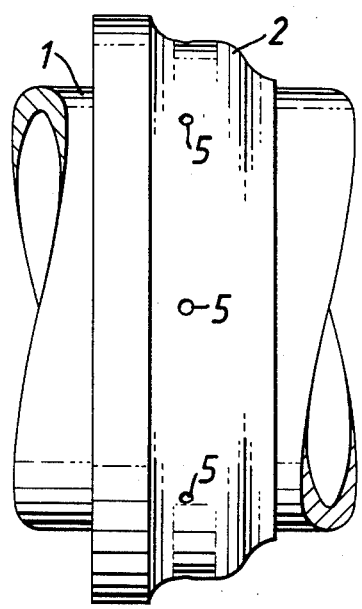
Figure 4:
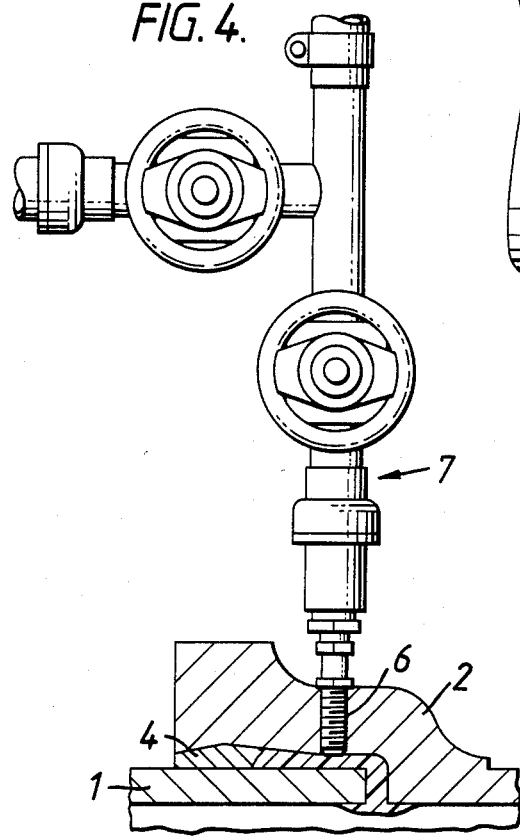
Figure 6:
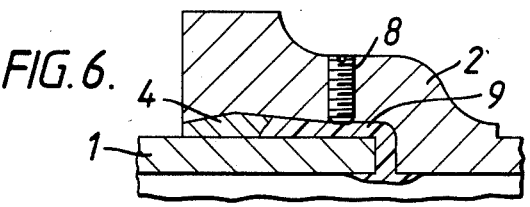
Figure 7:
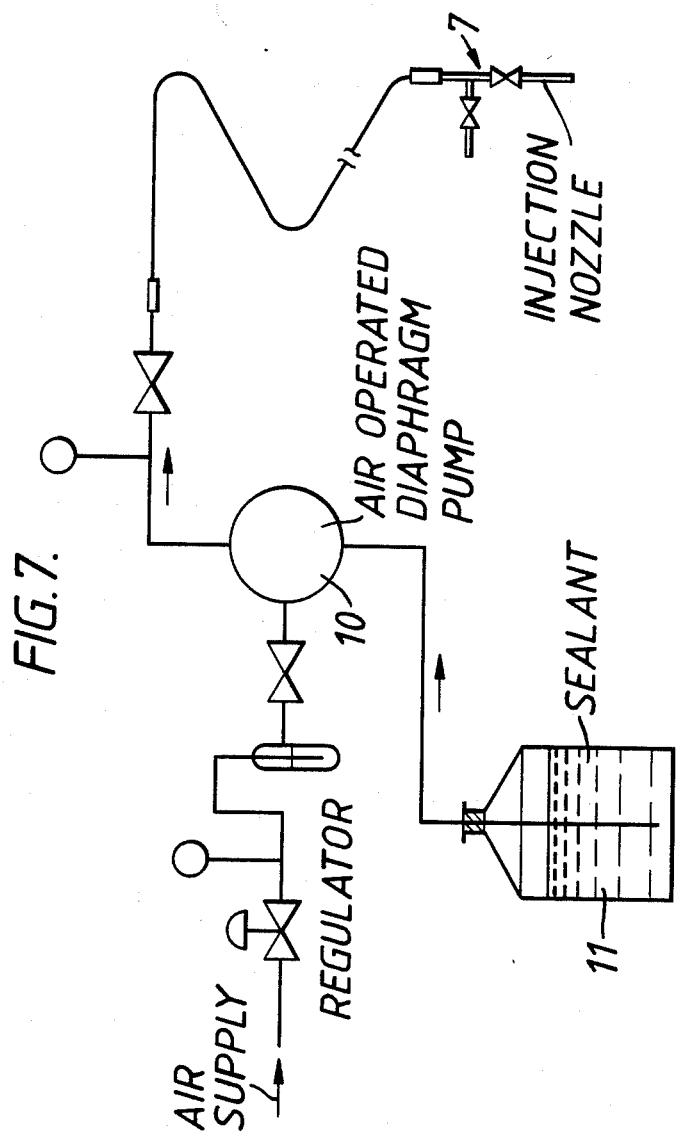

An embodiment of the invention will now be described with reference to the accompanying drawings in which:

FIG. 1 is a side view in section of a spigot-socket joint in a gas main showing in particular the existing lead-yarn seal, FIG. 2 is a side view in section of a spigot-socket joint in a gas main showing in particular the existing lead-yarn seal in which the yarn has worn away, FIG. 3 is a close-up view of a sectioned part of the joint shown in FIG. 2, a hole having been drilled through the socket into the joint gap at a point upstream of the lead seal, FIG. 4 shows a sealant injection device in position on the socket, FIG. 5 is an external view of the joint shown in FIG. 2, there being several circumferentially spaced holes drilled through the socket into the joint gap, FIG. 6 is a close-up view of a sectioned part of the joint, the sealant material having been injected into the joint gap, and FIG. 7 is a schematic fiew of a sealant pumping system.

Referring to FIGS. 1 and 2, these show spigot-socket joints typical of those commonly present in existing gas mains which were constructed of cast iron. The gap between the spigot 1 and the socket 2 was sealed at the time of laying with lead-yarn seals. In making the seal, the yarn 3 (FIG. 1) was first packed into the gap between the spigot and socket. Then lead 4 in its molten state was poured into the gap adjacent to the yarn 3 and was allowed to solidify. The lead 4 tends to shrink over the years and leave gaps and crevices for the leakage of gas through the joint. Providing the yarn is still present however, and moreover is maintained in a moist condition it will swell and maintain an effective seal even though the lead shrinks. Therefore it will be seen that the lead may merely serve as a retaining ring for the yarn.

In former years gas mains carried coal gas which had a relatively high moisture content and thus maintained the yarn in a moistened and thereby swollen condition. However, after the change over to natural gas it was found that the yarn tended to shrink and in some cases disappear altogether (FIG. 2) due to its dehydration by the relatively dry natural gas.

Consequently with the shrinkage or even disappearance of the yarn, gas leaks through the lead seals have become a common problem.

The invention described herein is designed effectively to reseal such joints by injecting into the yarn (if any) but at any rate into the joint gap upstream of the lead seal a quantity of a curable material from a point or points externally of the joint and allowing the material to cure in situ in the joint gap.

In order to do this a hole or holes similar to that designated 5 in FIG. 3 is drilled through the socket 2 into the joint gap upstream of the lead seal 4. The hole is then tapped as shown in FIG. 3 so that the externally-threaded nozzle 6 of a sealant injection device 7 (FIG. 4) can be engaged in the hole 5 for the injection of the sealant into the gap. Preferably sufficient sealant material is injected into the gap to form a contiguous circular band within the gap. This is best achieved by a sequential injection process whereby after a first hole has been drilled and tapped and sealant has been injected into the gap, subsequent circumferentially spaced holes are drilled and tapped and injected with sealant in sequence so that sealant is injected at several points around the circumference of the socket. FIG. 5 shows a socket in which this procedure has been followed.

After the sealant has been allowed to cure the hole or each hole is plugged by a threaded plug 8 as shown in FIG. 6.

Preferably the sealant is in liquid form so that it can flow by capillary action within the joint gap and occupy the entire joint gap upstream of the lead seal as shown by 9 in FIG. 6.

A preferred sealant is an anaerobically curable monomer such as one based on a methacrylate, This type of sealant has the advantage that since it is a one-component material no mixing is required so that the injection system can be of relatively simple design. Anaerobically curable monomers are available in liquid form and have the property of curing spontaneously or at least at a pre-selected rate in the absence of air. Injection of such a substance into the joint gap will cause air or any other gas to be driven out and the space to be occupied by the monomer so that air free conditions will be created for the curing of the monomer.

Suitable sealants are those manufactured by Permabond Ltd under numbers APP 531, 557 and 575 and Loctite under number L1/618/619. All these formulations are based on methacrylate monomers.

While the technique descirbed is suitable for sealing joints in gas mains which are "dead" that is are not carrying gas, it is of major benefit is sealing joints in "live" gas mains that is those carrying gas.

In this case the sealant should be injected at such a pressure that it enters the joint gap upstream of the lead seal but does not enter the bore of the main. We have found that the pressure of the gas is then sufficient to force the sealant against the existing seal and occupy any gas leakage paths in the existing seal.

Referring to FIG. 7 the sealant may be injected by means of an air operated diaphragm pump 10 which draws the sealant from a reservoir 11 into the injection device 7.

It will be appreciated that as a precaution existing non-leaking joints may be sealed by the technique described.

Furthermore we have found that it is possible to inject the sealant through the lead seal into the joint gap rather than through the socket itself and results have been satisfactory. In this case it is necessary to inject the sealant at a pressure slightly exceeding that of the gas pressure in the main to ensure that the sealant enters the joint gap. In order to inject the sealant in this manner, holes need to be drilled through the lead seal into the gap. The holes are plugged after the sealant has been injected into the gap.

We claim:

1. A method for sealing a joint in a gas bearing pipe, comprising the steps of:

drilling at least one hole in a joint gap at a point upstream of a pre-existing annular joint seal with respect to a flow direction of leaking gas;

injecting an anaerobically curable monomer into said joint gap in such a quantity that said monomer forms a contiguous band within said joint gap; and allowing said monomer to cure within said joint, wherein said drilling step comprises the steps of sequentially drilling a plurality of circumferentially spaced holes and wherein said injecting step comprises injecting said monomer into a drilled hole prior to drilling any subsequent hole of said plurality of holes.

2. A method for sealing a joint in a gas bearing pipe, comprising the steps of:

drilling at least one hole in a joint gap to a point upstream of a pre-existing annular joint seal with respect to a flow direction of leaking gas;

tapping said at least one hole;

injecting an anaerobically curable monomer into said joint gap in such a quantity that said monomer forms a contiguous band within said joint gap;

allowing said monomer to cure within said joint gap; and sealing said hole with a threaded plug after said injecting step.

3. The method of claims 1 or 2 wherein said monomer is based on a methacrylate.

* * * * *